July 19, 1955 L. W. NERO 2,713,612

TELEVISION SYSTEM

Filed Dec. 4, 1952 2 Sheets-Sheet 1

INVENTOR.
Leroy W. Nero
BY
Norman L. Mueller
Atty.

July 19, 1955

L. W. NERO

TELEVISION SYSTEM 2,713,612

Filed Dec. 4, 1952

2 Sheets-Sheet 2

INVENTOR.
Leroy W. Nero

BY
Norman L. Mueller
Atty.

2,713,612

TELEVISION SYSTEM

Leroy W. Nero, Chicago, Ill., assignor to Motorola, Inc., Chicago, Ill., a corporation of Illinois Application December 4, 1952, Serial No. 324,655

7 Claims. (Cl. 178—69.5)

Figures 1, 2, 6:
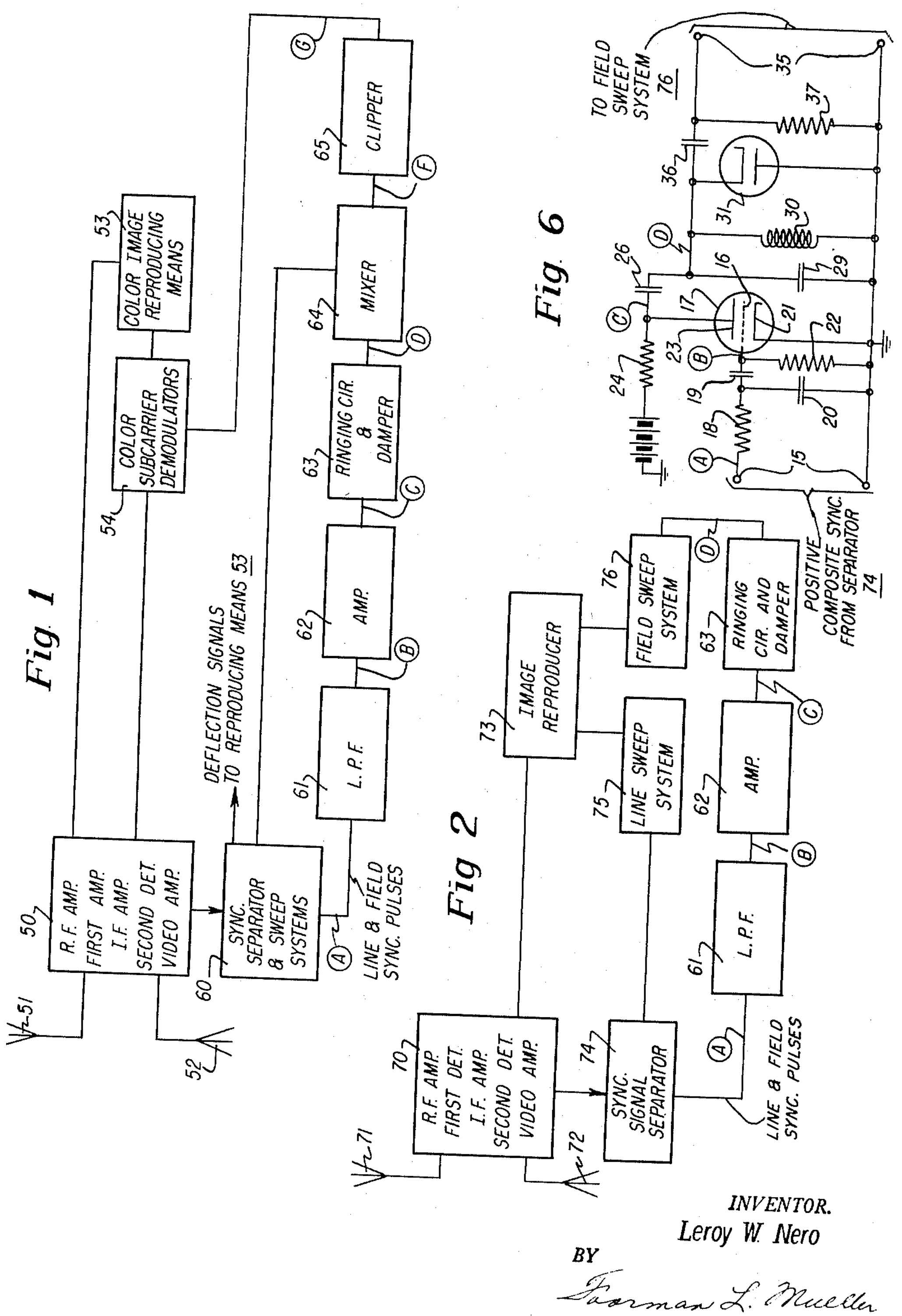

This invention relates generally to television systems and more particularly to a control circuit for use in a television receiver which responds to the synchronizing components of a received television signal to produce a series of pulses precisely timed with respect to the aforementioned synchronizing components, the control circuit being substantially immune to noise disturbances received concurrently with the synchronizing components.

The control circuit of this invention may be used in a television receiver for deriving a series of pulses each with an extremely steep leading edge and each being precisely timed with respect to the field synchronizing pulses of a received television signal, and the control circuit is constructed so as to be unresponsive for all practical purposes to noise disturbances received concurrently with the television signal. The derived pulses may be used for triggering the field sweep system of the receiver so that accurate synchronization of the field sweep system with the incoming television signal may be obtained. This is extremely important in present day systems in which the television signals are constituted by a series of frames of interlaced fields, since any inaccuracies in the field synchronization at the receiver impairs the interlaced reproduction of such fields.

In addition, the improved control circuit of this invention may be used in a color television system of the NTSC type such as is described in the February 1952 edition of Electronics Magazine published by McGraw-Hill Corp. in an article entitled "Principles of NTSC compatible color television" by C. J. Hirsch et al., at page 88 of that publication. In such a system, certain color information is modulated on a subcarrier whose phase is inverted between the first and second field of each frame of the color television signal. In order to recover such color information, it is necessary to produce at the receiver a demodulating signal whose phase is inverted in time coincidence with the phase inversions of the color subcarrier. The control circuit of this invention may be used to produce accurately timed pulses occurring at the proper times to effect such a phase inversion of the abovementioned demodulating signal. Moreover, the circuit is relatively immune to noise disturbances so that the demodulating signal may be inverted at the proper times and is not subject to spurious inversions even in the presence of noise.

It is, accordingly, an object of this invention to provide an improved control circuit for use in a television receiver or the like for producing a series of pulses having a precise time relation with respect to the synchronizing components of a received composite television signal.

A further object of the invention is to provide such an improved control circuit which is relatively immune to noise disturbances received concurrently with the television signal.

Yet another object of the invention is to provide such an improved control circuit for developing a series of pulses, each with an extremely steep leading edge, having a precise time relation with respect to the field synchronizing components of a received composite television signal, and which may be applied to the field sweep system of the receiver to achieve precise synchronization between the sweep system and the received television signal.

A feature of the invention is the provision of a control circuit for developing pulses having a predetermined and precise relationship with the field synchronizing components of a received composite television signal, and which includes a ringing circuit having a damping diode connected thereacross; with the diode being connected to suppress selected signal polarities impressed across and developed by the ringing circuit, but to have no effect on other signal polarities impressed across and developed by that circuit.

Figures 3, 4, 5:
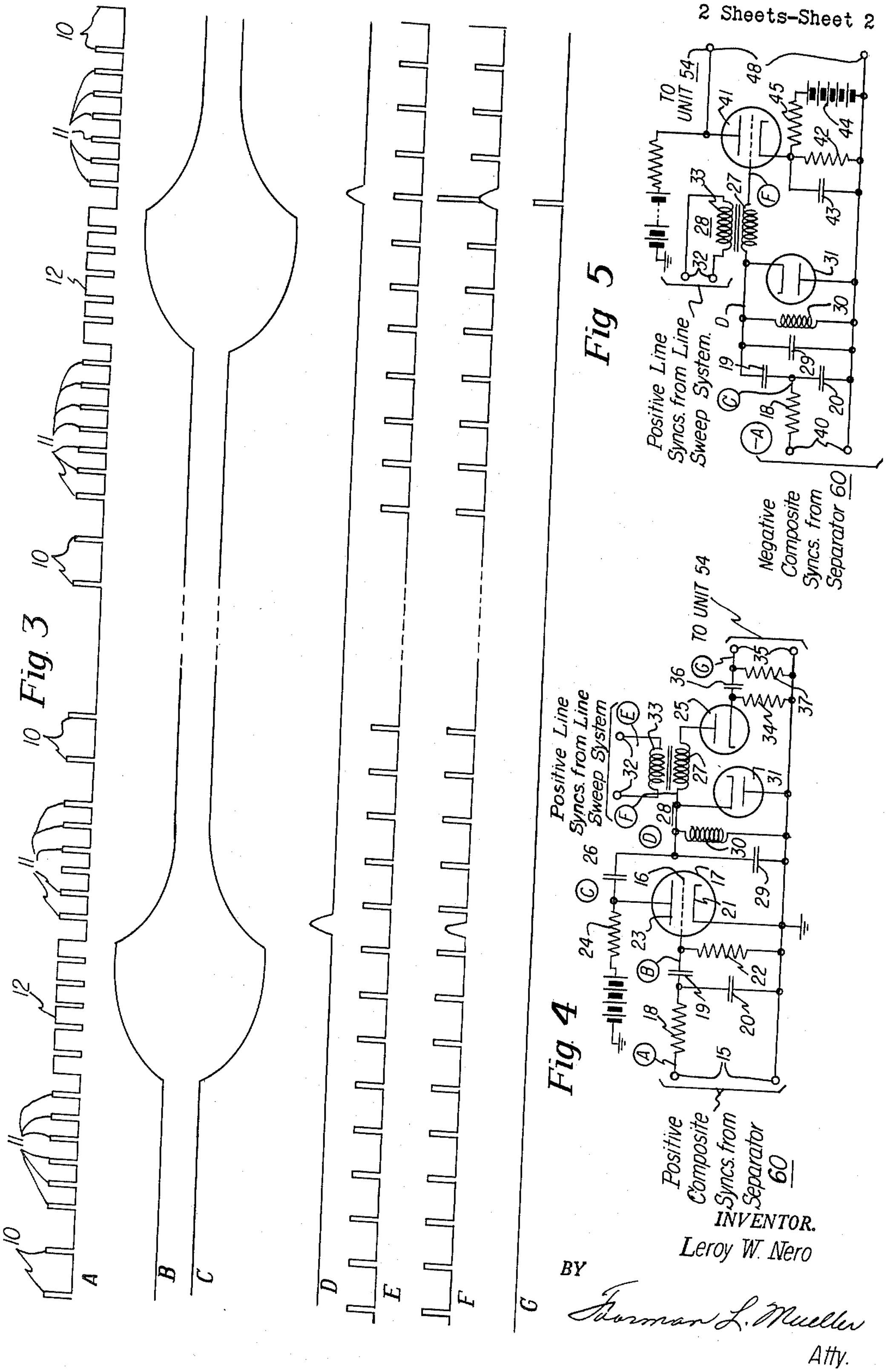

The above and other features of the invention which are believed to be new are set forth with particularity in the appended claims. The invention itself, however, together with further objects and advantages thereof may best be understood by reference to the accompanying drawings in which:

Fig. 1 is a schematic representation of a color television receiver of the previously mentioned NTSC type incorporating the invention, Fig. 2 is a schematic representation of a monochrome television receiver incorporating the invention, Fig. 3 comprises various curves useful in explaining the operation of the invention, and Figs. 4, 5 and 6 are detailed representations of various embodiments of the control circuit of this invention.

The control circuit of the invention is intended to be used in a television receiver or the like, and it utilizes the synchronizing components of a received television signal to exert a control on certain apparatus in such a receiver. The control circuit comprises a ringing circuit which is responsive to the differential of an applied signal for developing a sine wave, and includes a damping means connected to the ringing circuit for damping selected half-cycles of the sine wave developed by the ringing circuit and for rendering the ringing circuit responsive only to applied signals of a selected polarity. Circuit means is provided extending to the ringing circuit for applying a signal thereto having a differential of one polarity during the occurrence of each of the aforementioned synchronizing components and having a differential of a second polarity at the termination of each such synchronizing component. In this fashion, the control circuit produces a selected half-cycle of the aforementioned sine wave in response to each differential of one of the aforementioned polarities of the signal applied to the ringing circuit.

Referring now to the drawings for a clearer understanding of the invention, the color television receiver of Fig. 1 includes a radio frequency amplifier, first detector, intermediate frequency amplifier, second detector and video amplifier designated generally as 50. The input terminals of the radio frequency amplifier of unit 50 are connected to a suitable antenna 51, 52, and the output terminals of the video amplifier are connected to a suitable color reproducing means 53. The output terminals of the video amplifier are also connected to a unit 54 which demodulates the various color sub-carriers included in the color television signal to produce various color difference signals which are impressed on reproducing means 53.

Unit 50 is also connected to a unit 60 which includes a synchronizing signal separator and the line and field sweep systems of the receiver. The synchronizing signal separator portion of unit 60 is connected to a low-pass filter 61 and supplies line and field synchronizing pulses thereto. Filter 61 is coupled through an amplifier 62 to a ringing circuit and damper unit 63. Unit 63 is connected to a mixer circuit 64 having further input terminals connected to the line sweep system included in unit 60 to derive therefrom line synchronizing pulses developed in well known fashion in that sweep system. Mixer 64 has output terminals connected to a clipper 65 which, in turn, is connected to unit 54 to supply a series of control pulses to the latter unit. These control pulses are utilized in unit 54 to invert the phase of a color demodulating signal developed therein during the second field of each frame of the received color television signal for the reasons referred to previously herein and discussed in detail in the aforementioned article in Electronics Magazine. Units 61—65 constitute the control circuit of the invention and are to be described in detail hereinafter.

In accordance with the invention, line and field synchronizing pulses derived from unit 60 which were separated in that unit from a received color television signal are supplied to low-pass filter 61. These pulses are illustrated in curve A of Fig. 3 which shows a portion of the field retrace interval of the first and second interlaced fields of each frame of the received color television signal. During such retrace intervals, separator 60 supplies line synchronizing pulses 10, equalizing pulses 11 and serrated field synchronizing pulses 12 to low-pass filter 61. These pulses are fed to the filter with positive polarity and the circuit parameters of the filter are so chosen that it is unresponsive to the high frequency line and equalizing pulses and to most noise disturbances. The filter responds, however, to the serrated field synchronizing pulses to produce at its output terminals a control signal such as shown in curve 3B. The amplitude of the control signal has a positive differential or rate of change during the occurrence of each field synchronizing pulse 12 and rises to a maximum value at the termination of such pulse. At such termination, the amplitude of the control signal has a negative differential or rate of change and decreases to a minimum value. The control signal from filter 61 is amplified in amplifier 62 to produce the signal of curve 3C which is similar in shape to that of curve 3B but in phase opposition therewith. The control signal of curve 3C is applied to ringing circuit 63 which comprises a resonant network tuned preferably to one-half the line synchronizing frequency and having a relatively high quality factor. The ringing circuit responds to the differential of an applied signal to develop a sine wave whose half-cycles have a duration determined by the resonant frequency of that circuit.

In accordance with the invention, a damping diode is connected across ringing circuit 63 with a polarity to be conductive when the signal applied to the ringing circuit has a negative differential and for negative half-cycles of the ringing signal developed by the ringing circuit. In this manner, the control signal of curve 3C applied to the ringing circuit causes it to develop a positive half-cycle for each positive differential of the control signal, as shown in curve 3D, but to be unresponsive to the negative differential of the control signal since the latter differential causes the damping means to be conductive.

It is to be noted that any noise disturbances included in the synchronizing components of curve 3A have positive polarity, and such disturbances as are translated by low-pass filter 61 are amplified in amplifier 62 and applied to the ringing circuit with negative polarity. The negative polarity noise disturbances have little effect on the ringing circuit since they cause the damping means to be conductive. By this expedient, the ringing circuit is relatively immune to noise disturbances and develops the positive sine wave half-cycles of curve 3D only in response to the positive differential of the applied control signal.

The signal of curve 3D is applied to mixer 64 wherein it is mixed with positive line synchronizing pulses (curve 3E) derived in known fashion from the line sweep system of unit 60. It is present day practice to vary the relative timing between the line and field synchronizing pulses during each frame of the television signal between its first and second fields to achieve interlace. Because of this, and as shown in curve 3F, a line synchronizing pulse appears at the output of mixer 64 pedestalled upon each positive half-cycle of the signal of curve 3D corresponding to the even fields B of the television signal frames, but does not appear pedestalled for the odd fields A.

The signal of curve 3F from mixer 64 is applied to a clipper 65 which clips the pedestalled line synchronizing pulses to supply the pulses of curve 3G to unit 54. The last mentioned pulses are precisely timed with respect to the field synchronizing pulses which occur respectively between the odd and even fields of each frame of the television signal. The pulses of curve 3G are applied to unit 54 to invert the demodulating signal developed therein at the proper times so that that signal may have an inverted phase during the second field of each frame of the television signal which is necessary in an NTSC color television system.

The monochrome television receiver of Fig. 2 includes a unit 70 which contains stages similar to those of unit 50 discussed in conjunction with Fig. 1. Unit 70 has input terminals connected to an antenna circuit 71, 72 and output terminals connected to a usual monochrome cathode-ray image reproducing tube 73. Unit 70 is also connected to a synchronizing signal separator 74 which, in turn, is coupled to a line sweep system 75 and through units 61, 62 and 63 to a field sweep system 76.

The line and field synchronizing components of a monochrome television signal received by the receiver are separated from the video components thereof in unit 74 and are supplied to line sweep system 75. The line sweep system responds to the line synchronizing components to control the line sweep of reproducer 73. The line and field synchronizing components are also supplied to low-pass filter 61 which, as in the case of Fig. 1, responds thereto to produce the signal shown in curve 3B. The signal from the low-pass filter is amplified in amplifier 62 to produce the signal of curve 3C, the latter signal being impressed on the ringing circuit of unit 63. Unit 63 produces as before the positive sine wave half-cycles of curve 3D and these are impressed on field sweep system 76 to control that system.

Unit 63 produces, therefore, positive sine wave half-cycles which are precisely timed with respect to the field synchronizing components of the received television signal. These half-cycles are impressed on field sweep system 76 to synchronize it with the field synchronizing components of the television signal. The control circuit is relatively immune to noise disturbances so that the presence of noise with the synchronizing components does not affect adversely the field synchronization. Moreover, the ringing circuit of unit 63 may be tuned to have such a resonant frequency that the positive half-cycles developed by the unit have a width corresponding to half a line interval or less with a correspondingly steep leading edge. This assures that the field sweep system is actuated at precisely the same point by each half-cycle so that the system responds faithfully to the interlace action of the received television signal. In this manner pairing or other distortions of the lines of the two interlaced fields are circumvented, and the reproduction qualities of reproducer 73 are enhanced.

A circuit suitable for performing the functions of units 61—65 of Fig. 1 is shown in Fig. 4. This circuit comprises a pair of input terminals 15 connected to unit 60 to derive therefrom the positive line and field synchronizing pulses, such as shown in curve 3A. One of the terminals 15 is grounded and the other is coupled to the control electrode 16 of an electron discharge device 17 through a resistor 18 and capacitor 19. The junction of resistor 18 and capacitor 19 is bypassed to ground through a capacitor 20. The cathode 21 of device 17 is connected to ground and the control electrode 16 of that device is connected to ground through a grid leak resistor 22. The anode 23 of device 17 is connected to the positive terminal of a source of unidirectional potential through a load resistor 24, and the anode is coupled to the anode of a diode 25 through a coupling capacitor 26 and through the secondary winding 27 of a transformer 28. The junction of capacitor 26 and winding 27 is bypassed to ground through a capacitor 29 which is shunted by an inductance coil 30, capacitor 29 and coil 30 forming a ringing circuit which is shunted by a damping means comprising a diode 31. The diode is connected to be conductive whenever the upper terminal of network 29 and 30 is negative with respect to ground. Network 29 and 30 is preferably tuned to be resonant at one half the line synchronizing frequency so that the half-cycles of the sine wave developed by the network have a sufficient individual duration to provide appropriate pedestals for the line synchronizing pulses.

The circuit of Fig. 4 has a second pair of input terminals 32 connected to the line sweep system portion of unit 60 to derive positive line synchronizing pulses therefrom, terminals 32 being connected to the primary winding 33 of transformer 28. The cathode of diode 25 is connected to ground through a resistor 34, and is coupled to one of the output terminals 35 of the circuit through a coupling capacitor 36, the other output terminal being connected to ground and the output terminals being shunted by a resistor 37. Output terminals 35 are connected to unit 54 of Fig. 1.

The network comprising elements 18, 19, 20 and 22 functions as a type of low-pass filter to discriminate against the high-frequency line and equalizing pulses and most noise disturbances, but the filter integrates the field synchronizing pulses so as to apply the signal of curve 3B to discharge device 17. The discharge device amplifies the signal of curve 3B to supply the control signal of curve 3C to ringing circuit 29, 30. Any noise disturbances passed by the low-pass filter and translated by device 17 are of negative polarity causing damper diode 31 to be conductive so as to have no effect on the ringing circuit. Similarly the negative differentials of the control signal of curve 3C cause the damper diode to be conductive and likewise have no effect on the ringing circuit. However, each positive differential of the signal of curve 3C of positive polarity causes the ringing circuit to develop a positive sine wave half-cycle (shown in curve 3D), the ringing circuit being damped for the negative sine wave half-cycles by the damping diode 31. The positive half-cycles from the ringing circuit are mixed with the positive line synchronizing pulses from transformer 28 and applied to the anode of diode 25. The latter diode functions as a clipper so that only the pedestalled line synchronizing pulses of curve 3G are supplied to the output terminals 35 and are used in the previously described manner in unit 54.

The circuit of Fig. 5 constitutes a slight modification of that of Fig. 4 and is useful in color television receivers in which the synchronizing pulses derived from the synchronizing spring separator have negative rather than positive polarity. The circuit of Fig. 5 has a pair of input terminals 40 connected to such a synchronizing signal separator to derive synchronizing pulses such as shown in curve 3A but with negative polarity. One of the terminals 40 is grounded and the other is connected to the junction of capacitors 19 and 20 through resistor 18, capacitor 20 being connected between this junction and ground. Capacitor 19 is connected to the upper terminal of ringing circuit 29, 30 which, as before, is shunted by damper diode 31. The ringing and damping network is connected through the secondary winding 27 of transformer 28 to the control electrode of an electron discharge device 41. The cathode of device 41 is connected to ground through a cathode resistor 42 shunted by a capacitor 43, and the cathode is connected to the positive terminal of a source of unidirectional potential 44 through a resistor 45. Resistors 42 and 45 constitute a potentiometer across source 44 so that a forced positive bias is impressed on the cathode of device 41. The anode of device 41 is connected to the positive terminal of a source of unidirectional potential 46 through a resistor 47 and is further connected to one of the output terminals 48 of the circuit, the other output terminal being connected to ground. Output terminals 48, as before, are connected to unit 54 of Fig. 1 to supply control pulses thereto.

In the latter embodiment, the negative polarity synchronizing components are used directly to derive the control signal of curve 3C. The control signal is applied to the ringing circuit 29, 30 which, as before, develops the positive half-cycles of curve 3D. The signal of curve 3D is mixed with the positive polarity line synchronizing pulses in winding 27 of transformer 28 to obtain the signal of curve 3F which is applied to the control electrode of device 41. Device 41 is biased so that only the pedestalled line synchronizing pulses are translated thereby and which appear with negative polarity at the output terminals 48 to be used by the unit 54 of Fig. 1.

The circuit of Fig. 6 is merely a portion of the circuit of Fig. 4 and is intended to be used in the monochrome television receiver of Fig. 2. In the circuit of Fig. 6, the line and field synchronizing components such as shown in curve 3A are derived from separator 74 and pass through low-pass filter 18—22 to derive the control signal shown in curve 3B. The control signal is amplified and phase inverted by amplifier 17 to produce the signal of curve 3C which is impressed on ringing circuit 29, 30. The ringing circuit responds to the control signal of curve 3C as before and, due to diode 31, produces the positive sine wave half-cycles shown in curve 3D. As previously mentioned, the half-cycles of curve 3D may have a duration extending less than half a line to have an extremely step leading edge to provide precise and accurate control for field sweep system 76. Such control is unaffected by noise, and is such that the interlaced fields of the television signal are faithfully reproduced by the receiver.

The invention provides, therefore, a simple and convenient arrangement for identifying the fields of each frame of a color television signal so that apparatus in the color receiver may be triggered at the proper times to control the color demodulating signal developed in the receiver. Although a large measure of noise discrimination is obtained in the low-pass filter of the control circuit, it is still possible for noise disturbances of low frequency to be translated thereby. However, due to the provision of the damping diode across the ringing circuit, such noise disturbances merely render the diode conductive and have no effect on the ringing circuit. A constructed embodiment of the invention was found to be highly efficient in operation and immune to noise disturbances for all practical purposes. In fact, successful operation without spurious actuation of the control apparatus in the receiver was achieved with signal-to-noise ratios up to 1:1.

As also pointed out, the control circuit of this invention may be used in monochrome television receivers to produce control pulses for the field sweep system of the receiver which are unaffected by noise disturbances and which enhance the response of the receiver to the interlaced fields of the television signal.

While particular embodiments of the invention have been shown and described, modifications may be made, and it is intended in the appended claims to cover all such modifications as fall within the true spirit and scope of the invention.

I claim:

1. A control circuit for a television receiver and the like for utilizing synchronizing components of a received television signal to control apparatus in such receiver, said control circuit including in combination, a ringing circuit responsive to the differential of an applied signal for developing a sine wave, damping means connected to said ringing circuit for damping selected half-cycles of the sine wave developed thereby and for rendering said ringing circuit responsive only to applied signals of a selected polarity, and low pass filter circuit means responsive to the synchronizing components for integrating said components and extending to said ringing circuit for applying a signal thereto having a differential of one polarity during the occurrence of each such synchronizing component and having a differential of a second polarity at the termination of each such synchronizing component, whereby said control circuit produces a selected half-cycle of the aforementioned sine wave in response to each differential of one of the aforementioned polarities of the signal applied to said ringing circuit.

2. A control circuit for a television receiver and the like for utilizing synchronizing components of a received television signal to control apparatus in such receiver, said control circuit including in combination, a network responsive to such synchronizing components for producing a control signal having a differential of one polarity during the occurrence of each such synchronizing component and having a differential of a second polarity at the termination of each such synchronizing component, a ringing circuit responsive to the differential of an applied signal for developing a sine wave, damping means connected to said ringing circuit for damping selected half-cycles of the sine wave developed thereby and for rendering said ringing circuit responsive only to applied signals of a selected polarity, and circuit means extending from said first mentioned network to said ringing circuit for applying the aforesaid control signal thereto to cause said control circuit to produce a selected half-cycle of the aforementioned sine wave in response to each differential of said control signal of one of the aforementioned polarities.

3. A control circuit for a television receiver and the like for utilizing the field synchronizing components of a received television signal to control apparatus in such receiver, said control circuit including in combination, a network responsive to such field synchronizing components for producing a control signal having a differential of one polarity during the occurrence of each such field synchronizing component and having a differential of a second polarity at the termination of each such field synchronizing component, an inductance-capacitance parallel-resonant ringing circuit responsive to the differential of an applied signal for developing a sine wave, a damping diode connected in shunt with said ringing circuit for damping selected half-cycles of the sine wave developed thereby and for rendering said ringing circuit responsive only to applied signals of a selected polarity, and circuit means extending from said first mentioned network to said ringing circuit for applying the aforesaid control signal thereto to cause said control circuit to produce a selected half-cycle of the aforementioned sine wave in response to each differential of said control signal of one of the aforementioned polarities.

4. A control circuit for a television receiver and the like for utilizing the field synchronizing components of a received television signal to control apparatus in such receiver, said control circuit including in combination, a filter network, circuit means for applying the line and field synchronizing components of a received television signal to said filter network, said network developing a control signal having a negative differential during the occurrence of each field synchronizing component and having a positive differential at the termination of each field synchronizing component, a ringing circuit responsive to the differential of an applied signal for developing a sine wave, damping diode means shunted across said ringing circuit with a polarity to be conductive during negative half-cycles of the sine wave developed thereby to damp such half-cycles, and circuit means extending from said filter network to said ringing circuit for applying the aforesaid control signal thereto to cause said control circuit to develop a positive half-cycle of the aforementioned sine wave in response to each positive differential of said control signal.

5. In a television receiver for utilizing a television signal having synchronizing components and undesired noise disturbances and which includes apparatus for producing such synchronizing components and noise disturbances with a selected polarity, a control circuit for controlling apparatus in such receiver including in combination, a network coupled to the first-mentioned apparatus for producing a control signal having a first differential of a first polarity during the occurrence of each such synchronizing component and having a second differential of a second polarity at the termination of each such synchronizing component and subject to produce at least a portion of the aforesaid noise disturbances with the polarity of said first differential, a ringing circuit responsive to the differential of an applied signal for developing a sine wave, damping means connected to said ringing circuit for damping selected half-cycles of the sine wave developed thereby and for rendering said ringing circuit responsive only to applied signals of the polarity of the aforesaid second differential, and circuit means extending from said first mentioned network to said ringing circuit for applying the aforesaid control signal thereto to cause said control circuit to produce a selected half-cycle of the aforementioned sine wave in response to each differential of said control signal of said second polarity.

6. In a television receiver for utilizing a television signal having line and field synchronizing components and undesired noise disturbances and which includes a scanning system to be synchronized with such field synchronizing components, and which also includes apparatus for producing such line and field synchronizing components and noise disturbances with a selected polarity, a control circuit for controlling apparatus in such receiver including in combination, a network coupled to the first-mentioned apparatus for producing a control signal having a first differential of a first polarity during the occurrence of each such field synchronizing component and having a second differential of a second polarity at the termination of each such synchronizing component and subject to produce at least a portion of the aforesaid noise disturbances with the polarity of said first differential, a ringing circuit responsive to the differential of an applied signal for developing a sine wave, damping means connected to said ringing circuit for damping selected half-cycles of the sine wave developed thereby and for rendering said ringing circuit responsive only to applied signals of the polarity of the aforesaid second differential, and circuit means extending from said first mentioned network to said ringing circuit for applying the aforesaid control signal thereto to cause said control circuit to supply to the aforesaid scanning system a selected half-cycle of the aforementioned sine wave in response to each differential of said control signal of said second polarity.

7. In a color television receiver for utilizing a color television signal having line and field synchronizing components and having video components occurring in a series of frames each with two interlaced fields, and which further includes a trigger circuit, a control circuit for the trigger circuit including in combination, a network responsive to the aforesaid synchronizing components for producing a control signal having a first differential of one polarity during the occurrence of each such field synchronizing component and having a second differential of a second polarity at the termination of each such field synchronizing component, a ringing circuit responsive to the differential of an applied signal for developing a sine wave, damping means shunted across said ringing circuit for damping selected half-cycles of the sine wave developed thereby and for rendering said ringing circuit responsive only to applied signals of the polarity of the aforesaid second differential, circuit means extending from said first mentioned network for applying the aforesaid control signal thereto to develop a selected half-cycle of the aforementioned sine wave in response to each of said first differentials of said control signal, a mixer circuit responsive to the selected half-cycles of said sine wave from said ringing circuit and to said line synchronizing components to produce a composite wave in which a line synchronizing component is pedestalled on one of said selected half-cycles of the aforesaid sine wave at the commencement of a selected field in each frame of the aforesaid television signal, and means for using the aforesaid pedestalled line synchronizing components to actuate the aforementioned trigger circuit in said receiver.

References Cited in the file of this patent

UNITED STATES PATENTS

| | | |
|---|---|---|
| 2,511,146 | Beste | June 13, 1950 |
| 2,539,440 | Labin | Jan. 30, 1951 |
| 2,546,972 | Chatterjea | Apr. 3, 1951 |
| 2,611,033 | Jones | Sept. 16, 1952 |